US010375322B2

(12) United States Patent
Ando et al.

(10) Patent No.: US 10,375,322 B2
(45) Date of Patent: Aug. 6, 2019

(54) OPTICAL OBSERVATION DEVICE

(71) Applicant: KAMAKURA KOKI CO., LTD., Saitama (JP)

(72) Inventors: Kunio Ando, Saitama (JP); Kazuya Miyaji, Saitama (JP)

(73) Assignee: KAMAKURA KOKI CO., LTD., Saitama (JP)

( * ) Notice: Subject to any disclaimer, the term of this patent is extended or adjusted under 35 U.S.C. 154(b) by 4 days.

(21) Appl. No.: 15/880,174

(22) Filed: Jan. 25, 2018

(65) Prior Publication Data
US 2018/0227503 A1 Aug. 9, 2018

(30) Foreign Application Priority Data

Feb. 6, 2017 (JP) ................. 2017-019211
Feb. 6, 2017 (JP) ................. 2017-019212

(51) Int. Cl.
*H04N 5/265* (2006.01)
*H04N 5/33* (2006.01)
*G01J 5/08* (2006.01)
*G01J 5/10* (2006.01)
*G01J 5/00* (2006.01)
*H04N 5/232* (2006.01)
*G02B 23/00* (2006.01)

(52) U.S. Cl.
CPC ............ *H04N 5/265* (2013.01); *G01J 5/0003* (2013.01); *G01J 5/0806* (2013.01); *G01J 5/10* (2013.01); *H04N 5/33* (2013.01); *G01J 2005/0077* (2013.01); *G01J 2005/0085* (2013.01); *G02B 23/00* (2013.01); *H04N 5/23293* (2013.01)

(58) Field of Classification Search
CPC ...... H04N 5/265; H04N 5/33; H04N 5/23293; G01J 5/0003; G01J 5/0806; G01J 5/10; G01J 2005/0085; G01J 2005/0077; G02B 23/00
USPC .......................................... 348/165
See application file for complete search history.

(56) References Cited

U.S. PATENT DOCUMENTS

| | | | | |
|---|---|---|---|---|
| 2003/0160757 A1* | 8/2003 | Shirai | ...................... | G01C 1/04 345/156 |
| 2006/0168871 A1* | 8/2006 | Wagner | ...................... | F41G 1/38 42/122 |
| 2007/0209268 A1* | 9/2007 | Birurakis | .................. | F41G 1/35 42/119 |
| 2013/0162835 A1* | 6/2013 | Forland | .............. | H04N 5/23222 348/164 |

FOREIGN PATENT DOCUMENTS

| | | |
|---|---|---|
| JP | S51-004886 B | 2/1976 |
| JP | H06-017829 B | 3/1994 |

* cited by examiner

*Primary Examiner* — Allen C Wong
(74) *Attorney, Agent, or Firm* — Arent Fox LLP

(57) ABSTRACT

An optical observation device for observing a target located at a distant observation sight that comprises an observation telescope and an infrared sighting device. The infrared sighting device eventually provides a visual target image as a sighting marker from a thermal infrared image of the observation sight. The sighting marker and the observation sight are simultaneously viewed in the field of view of the observation telescope so as to enable training of the observation telescope on a part of the observation sight where the target is located.

24 Claims, 6 Drawing Sheets

OPTICAL OBSERVATION DEVICE

CROSS-REFERENCE TO RELATED APPLICATIONS

This application claims priority to Japanese Patent Application Nos. 2017-019211 and 2017-019212, both filed on Feb. 6, 2017. The disclosures of the priority applications are incorporated in their entirety herein by reference.

BACKGROUND OF THE INVENTION

1. Field of the Invention

The present invention relates to an optical observation device, such as a visible light field scope, equipped with an infrared sighting device for easy acquisition of an observation target to be observed.

2. Description of Related Art

Conventionally, in the case of, for instance, bird watching where a distant diminutive observation target is observed, optical observation devices of large magnifications such as field scopes and binoculars are commonly used.

At the same time, since the optical observation device is equipped with a magnification as large as, for instance, ×50 in order to meet the purpose of observation of a distant diminutive object such as a wild bird, it has only a smaller fixed range of viewing field for observation (a field of view) for observation, which is no more than approximately a few degrees, and unavoidably encounters difficulties in finding or capturing such distant diminutive wild birds (observation targets) within the narrow viewing field. Consequently, in field or open-air observations, such as with bird watching, using optical observation devices essentially requires field observers or bird-watchers to trust their experiences and/or their intuition in finding or capturing the distant diminutive wild bird (observation target) within the narrow field of view of the optical observation device.

Meanwhile, because an infrared image of an observation target produced by infrared light contains information on the observation target which is never derived from a visible optical image of the observation target produced by visible light, it has been proposed in the technical field of optical observation to use a combination of infrared images and visible images (a composite image). Techniques of optical field observation such as using one or more visible optical images in combination with one or more infrared images are disclosed in, for instance, the publications of examined Japanese patent applications No. 51(1976)-4886 and No. 6(1994)-17829. In particular, as disclosed in the publication of examined Japanese patent application No. 6(1994)-17829, the optical display device is intended to detect an observation target with case by incorporating an infrared image into a visible image observation device. In either case, these images, an image in the visible region and an image in the infrared region, are primarily provided in the form of an electronic image and electronically composed together.

SUMMARY OF THE INVENTION

It is therefore an object of the present invention to provide an optical observation device which is of high power and equipped with an infrared sighting device for implementation of an enhanced ability for easily finding or acquiring an observation target in an intended forward observation sight.

The above object of the present invention is accomplished by an optical observation device for field or open-air observations of a target object staying in a forward observation sight comprising an optical telescopic means situated on one of a pair of parallel optical axes, and an infrared sighting means situated on the other of the pair of parallel optical axes and optically coupled to the optical telescopic means. The optical telescopic means produces a visible image of the forward observation sight for an observation of a target object located in the forward observation sight. The infrared sighting means provides a visible image of the observation target as a sighting marker from an infrared image of the forward observation sight and spatially displays the sighting marker, namely a visible image of the observation target, in an image focus location of the optical telescopic means so as to superimpose the visible image of the observation target as a sighting marker on the visible image of the forward observation sight for simultaneous observation of both the visible image of the observation target and the forward observation sight through the optical telescopic means.

According to a preferred embodiment of the present invention, the optical telescopic means comprises a monocular optical telescope having at least a first objective lens system for producing the visible image of the forward observation sight acquired in a field of view thereof and a first eyepiece lens system for viewing the visible image of the forward observation sight. The objective lens system and the first eyepiece lens system are arranged coaxially along one optical axis. On the other hand, the infrared sighting means, which includes the first eyepiece lens system as one structural component part thereof, comprises an infrared imaging means and a visible image display means. The infrared imaging means comprises a second objective lens system for forming the infrared image of the forward observation sight and an infrared-light sensor device on which the infrared image of the observation sight is cast in the form of temperature distributions. The second objective lens system and the infrared image sensor device are arranged coaxially along the other optical axis. The visible image display means comprises an image processor capable of performing, by means of signal processing, an extraction of an infrared image of the observation target from the infrared image of the forward observation sight cast on the infrared image sensor device according to a predetermined extraction temperature as well as a conversion of the extracted infrared image of the observation target to a visible image; a visible image display device capable of displaying the visible image of the observation target thereon; and an image projection optical system capable of spatially displaying the visible image of the observation target cast on the visible image display device in an image focus location of the first objective lens system of the optical telescopic means so as thereby. The visible image of the observation target displayed and superimposed as a sighting marker on the visible image of the forward observation sight in the view field of the first eyepiece lens system allows simultaneous observation of the visible images of the forward observation sight and the observation target together through the first eyepiece lens system of the monocular optical telescope. With the sighting marker on the forward observation sight displayed on an image of the visible image of the forward observation sight, it is quite easy to ensure finding in the sight field or training the optical observation device on an observation target, such as a wild bird or wild birds in a forward observation sight, such as a thickly-wooded field, which are conventionally difficult to acquire in the field of view of the optical observation device, enabling the acquisition of the observation target near the center of the field of view of the optical observation device by means of orienting the sighting marker toward the center of the field of view of the infrared sighting device.

The image projection optical system may comprise a relay lens system for projecting and spatially displaying the visible image of the observation target cast on the visible image display device and a half mirror disposed on an optical path along one optical axis for orienting the displayed visible image of the observation target with the image focus location of the first objective lens system.

The infrared sighting means may be altered by the infrared imaging means and the visible image display means. The infrared imaging means comprises a second objective lens system for forming the infrared image of the observation sight and an infrared image sensor device on which the infrared image of the observation sight is cast in the form of temperature distributions, and with the second objective lens system and the infrared image sensor device being arranged coaxially along the other optical axis.

The visible image display means, including the first eyepiece lens system as one structural component part thereof, comprises an image processor capable of performing, by means of signal processing, an extraction of an infrared image of the observation target from the infrared image of the forward observation sight cast on the infrared image sensor device according to a predetermined extraction temperature as well as a conversion of the extracted infrared image to a visible image of the observation target, and a transmissive visible image display device disposed in the in the image focus location of the first objective lens system of the monocular optical telescope capable of displaying the visible image of the observation target thereon. This alteration dispenses with the installation of the image projection optical system between the monocular optical telescope and the infrared sighting means, and consequently, produces satisfactory images, leads to simplification, and cost reduction of the optical observation device.

According to an alternative preferred embodiment of the present invention, the optical observation device comprises an optical telescopic means comprising at least a first objective lens system and a first eyepiece lens system which are arranged coaxially along one of a pair of parallel optical axes which are received in a discrete first housing, and the infrared sighting means comprises an infrared imaging means and visible image display means which are received in a discrete second housing pivotally coupled to the discrete first housing. The optical telescopic means produces a visible image of the forward observation sight which is inhabited by an observation target and acquired in a field of view thereof for observation through the eyepiece lens system. The infrared imaging means comprises a second objective lens system and an infrared image sensor device arranged coaxially along the other optical axis. The second objective lens system produces an infrared image of the observation sight which is cast in the form of temperature distributions on the infrared image sensor. Further, the visible image display means comprises an image processor, a visible image display device and a second eyepiece lens system arranged coaxially along an optical axis of the second eyepiece lens system. The image processor performs, by means of signal processing, an extraction of an infrared image of the observation target from the infrared image of the forward observation sight cast on the infrared image sensor device according to a predetermined extraction temperature and a conversion of the extracted infrared image to a visible image of the observation target. The visible image display device displays the visible image of the observation target thereon in the image focus location of the second eyepiece lens system. The visible image of the observation target is viewed through the second eyepiece lens system for sighting the optical telescopic means on the observation target. The optical observation device structured in this manner allows for the observation of the forward observation sight with one eye, for instance with the right eye, and observation of the observation target as a sighting marker with the other eye, for instance the left eye, simultaneously.

The optical telescopic means and the infrared sighting means are preferably received in discrete housings pivotally coupled using a rotation motion in order to adjust the inter-axial distance between the pair of parallel axes to account for individual eye separation. The inter-axial distance between the parallel axes may vary between 60 mm and 70 mm.

While, when making an attempt to observe targets such as wild birds located in a thickly-wooded area or in poor light, it is quite hard for conventional observation devices to find and acquire the observation targets such as wild birds under these circumstances; nevertheless, because the infrared sighting means is capable of easily finding and capturing a wild bird which is the observation target and enables the observation target to be observed simultaneous together with the observation sight in the field of view of the optical telescopic means, the infrared sighting means allows for the orientation of the optical observation device by means of the sighting marker so as to locate the observation target near the center of the field of view of the optical telescopic means. Consequently, the optical observation device of the present invention ensures easy and untroublesome field observation.

The image processing means is preferably configured so as to extract the infrared image of the observation target according to predetermined extraction temperatures of thermal radiation emitted from the observation target. The extraction temperature may be, fixedly or variably, selected from the range of 38° C. to 42° C. which are the general thermal radiation temperatures of wild birds.

The visible image display device of the visible image display means may be of the type capable of being functionally disabled in order to clear away an on-screen image cast thereon. This disablement of the visible image display device is effected after acquirement of the observation target around the center of the field of view of the monocular optical telescope. Then, the optical observation device ensures absolutely clear observation of the forward observation sight inhabited by an observation target such as wild birds. For more concisely and reliably trained open-air observation, the infrared sighting device is preferred to have a view angle greater than that of the monocular optical telescope, or otherwise, to have a variable view angle thereof. Further, it is preferred to color the visible image in a visually perceivable manner.

BRIEF DESCRIPTION OF THE DRAWINGS

The above and other objects and features of the present invention will clearly be understood from the following description with respect to the preferred embodiments thereof when considered in conjunction with the accompanying drawings wherein.

DETAILED DESCRIPTION OF THE PREFERRED EMBODIMENTS

Figure 1:
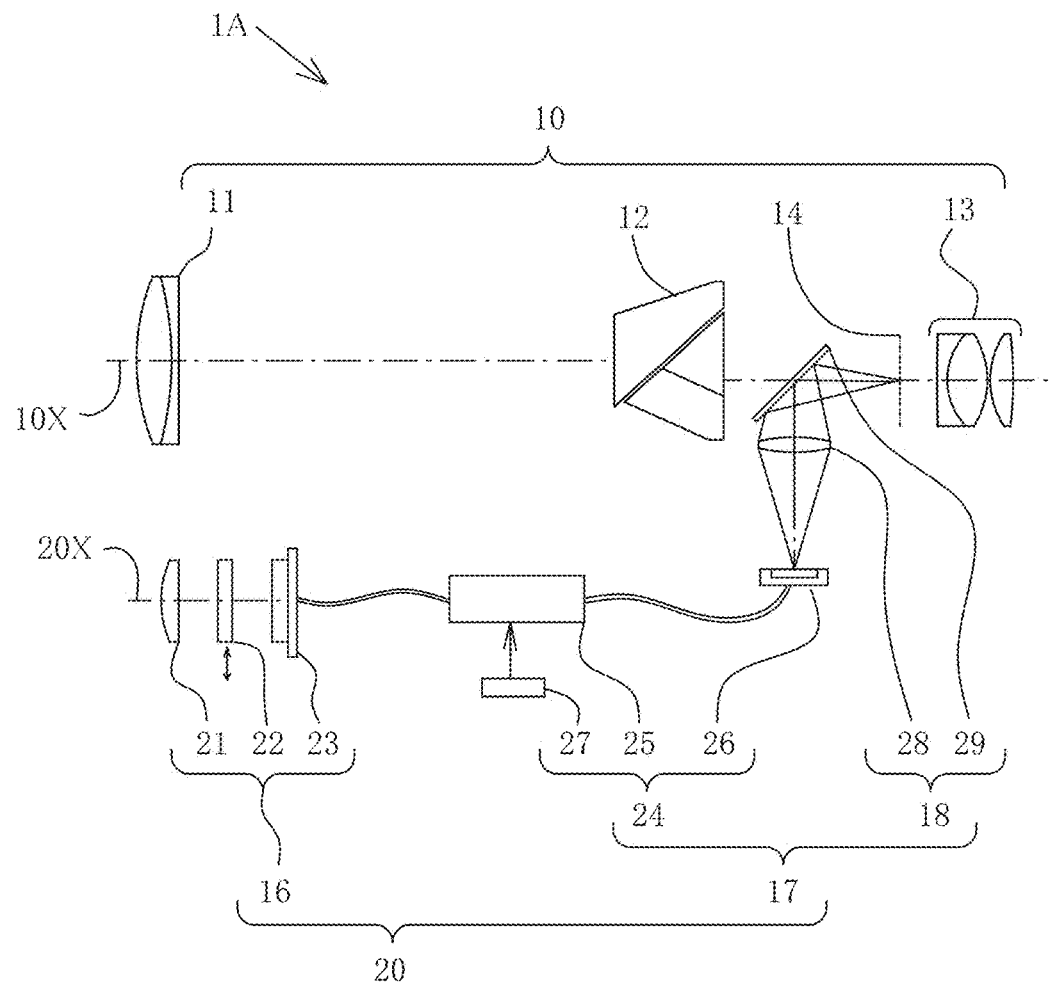
FIG. 1 is a schematic illustration showing an optical observation device of a monocular-shaped type in accordance with a preferred embodiment of the present invention.

Generally, it is popular in the field of bird watching to use monocular telescopes, which are known as field scopes, and binocular telescopes. Since the field scope is a ground-based monocular telescope, is often used with a tripod stand, and is easily raised in power by changing an eyepiece lens, it is well suited for field observation of wild birds.

In field observation in bright environments such as with daytime observation, when observing wild birds in a forward, clear field or waterside wild birds, it is relatively easy for observation devices to acquire a wild bird as an observation target in the field of view and to search for details. On the other hand, in other circumstances, bird watching can be difficult when finding or acquiring wild birds located in trees or wild birds in a twilight field such as in the evening, and essentially requires field observers or bird-watchers to trust their experiences and/or their intuition.

Meanwhile, mammals, and birds as on type of animals are homeothermal and have fixed body temperatures. Many animals other than these homeothermal animals are poikilothermal. The body temperatures of birds, i.e. the thermal radiation temperature of birds, are in the approximate range from 38° C. to 42° C. Among birds, small wild birds have relatively higher body temperatures than those of big wild birds. Consequently, when hunting for a small wild bird with an infrared image (thermal image) in the form of temperature distributions, it is relatively easy to find the small wild bird.

Dogs and cats, which are also homeothermal, have body temperatures lower than wild birds and the body temperatures are less than approximately 39° C. in many cases. Accordingly, when displaying an infrared image of any animals in the form of temperature distributions and then specifying either a dog or cat with the appropriate body temperature, only the dog or cat can be extracted in the form of infrared image from the observation sight inhabited or containing the dog or cat. In this way, infrared imaging enables the easy hunting and finding of an observation target.

In recent years, various non-cooled type infrared light sensors have become more readily available. While thermo images generated by a non-cooled type infrared-light sensor consists of comparatively fewer pixels than those of the visible images generated by visible-light sensors or the optical images generated by field scopes and the non-cooled infrared light sensors produce significantly poorer quality images, the thermo image represents a temperature distribution of an observation object as a target of observation and is consequently highly discriminative with respect to the observation sight. Therefore, as compared with conventional optical observation devices such as field scopes, the optical observation device of the present invention equipped with the infrared-light sensor capable of generating a thermal image of an observation target which is highly discriminative from the observation sight is suitable for field observation such as bird watching.

Specifically, the optical observation device is implemented by equipping the infrared sighting means so as to display a thermal image of an observation target on an image display device such as an LCD device and to superimpose a sighting marker, which is created as a visible image from the thermal image of the observation target, on the visible image for simultaneous observation of the observation target and the observation sight through the optical telescopic means.

Referring to FIG. 1 which schematically illustrates an optical observation device 1A which is of a monocular-shaped telescope according to a preferred embodiment of the present invention, the optical observation device 1A, which has a single rigid configuration, is comprised of two functional devices, namely an optical telescopic means or an observation telescope 10 for observing a distant observation object, i.e. the target of observation, in a forward objection field and an infrared sighting means or an infrared sighting device 20 for assisting in appropriately training or sighting the observation telescope 10 on the observation target. The observation telescope 10 is functionally similar to a monocular-shaped discrete telescope such as a field scope conventionally known in the art for providing a magnified optical image of a distant observation target in the field of view thereof. The infrared sighting device 20 conclusively produces a visible image of the distant observation target as a sighting marker in the field of view thereof which assists the wearer (viewer or observer) to acquire the distant observation target near the center of the field of view of the observation telescope 10.

The observation telescope 10 produces an image of the distant observation target by means of wavelengths from the visible spectrum. On the other hand, the infrared sighting device 20 primarily produces an infrared or thermal image of a distant observation target by means of wavelengths from the infrared region and transforms the thermal image partially into a visible image which functions as a sighting marker. These devices 10 and 20 have their optical axes 10X and 20X arranged in parallel and are built in an integral housing (not shown).

Specifically, the observation telescope 10 is essentially comprised of an objective lens system 11, an erecting prism 12 and an eyepiece lens system 13 arranged coaxially in this order along the optical axis 10X. The observation telescope 10 produces a visible optical image of a distant observation target acquired in the field of view thereof in an image focus location 14 of the objective lens system 11, which is consistent with a focal position of the eyepiece lens system 13 of the optical observation device 1A, and enables the wearer to view the visible optical image of the observation target in the intended observation sight through the eyepiece lens system 13.

On the other hand, the infrared sighting device 20 is essentially comprised of infrared imaging means 16 and visible image display means 17. The infrared imaging means 16 is comprised of an objective lens system 21 and an infrared light sensor device 23 coaxially arranged along the optical axis 20X so as to form an infrared or thermal image of a distant observation sight acquired in the field of view thereof on the infrared light sensor device 23. The infrared light sensor device 23 receives an infrared or thermal image formed by the objective lens system 21 and casts it in the form of a temperature distribution thereon. It is permissible to employ various types of infrared light sensor elements or devices well known in the art such as non-cooled type of infrared light sensor elements in place of the infrared light sensor device 23. The visible image display means 17 is comprised of an image generator 24 and an image projection optical system 18. The image generator 24 is comprised of an image processor 25 and a visible image display device 26. The image processor 25 transforms the thermal image of the observation sight cast on the infrared light sensor device 23 partially into a visual image which is displayed as a visible image of the observation target on the visible image display device 26. More specifically, the image processor 25 performs, by means of signal processing, an extraction of a part of the thermal image according to specified characteristic features, such as temperatures, peculiar to the observation target to be intentionally observed. Taking bird watching for instance, an infrared image of a wild bird located either, visibly recognizably or latently, in a forward wooded field with the observation sight confined by the view angle of the objective lens system 21 is extracted from an infrared image of the forward wooded field based on body temperatures peculiar to the wild bird to be intentionally watched, i.e. temperatures of the infrared radiation emitted from the wild bird to be intentionally watched. The image processor 25 transforms the extracted infrared image of the wild bird into a visual image by displaying it on the visible image display device 26. Both the image processor 25 and the visible image display device 26 an arranged in this order in an optical path along an extension of the optical axis 20X, or otherwise off axially. It is permissible to employ various types of image displays well known in the art such as liquid crystal displays (LCDs) and electroluminescence displays (ELDs) as the visible image display device 26.

The image projection optical system 18, through which the infrared sighting device 20 and the observation telescope 10 are optically coupled to one another, projects the visual image of the observation target displayed on the visible image display device 26 for spatial display in the image focus location 14 of the objective lens system 11 of the observation telescope 10 and, thereby, superimposes it as a sighting marker on the visual image of the observation sight captured in the field of view of the observation telescope 10. Specifically, the image projection optical system 18 is comprised of at least a relay lens system 28 for forming an optical image of the observation target and a half mirror 29 disposed in an optical path along the optical axis 10X of the observation telescope 10 at an angle of 45° so as to display the optical image of the observation target in quality of a sighting marker spatially and to superimpose it on the optical image of the same observation sight.

The infrared sighting device 20, more specifically the infrared imaging means 16, may preferably be equipped with a shutter 22 in position in an optical path along the optical axis 20X between the objective lens system 21 and the infrared light sensor device 23. The infrared sighting device 20, more specifically the image processor 25 of the visible image display means 17 may further be equipped with a selector dial 27 associated with the image processor 25. The shutter 22 is capable of moving in and out of the in-between position. When moved into the optical path along the optical axis 20X between the objective lens system 21 and the infrared light sensor device 23, the shutter 22 is capable of allowing correction for sensitivity differences among pixels of the infrared light sensor device 23. The selector dial 27 is operated so as to enable the image processor 25 to switch among built-in functional modes according to need and, in addition, to set extraction temperatures according to which part of the whole image cast on the infrared light sensor device 23 is to be partially extracted as will be described in detail later. The built-in functional modes include at least, for instance, a partial image display mode in which the thermal image cast on the infrared light sensor device 23 is extracted partially according to set temperatures and displayed on the visible image display device 26 and a non-display mode in which an on-screen image disappears from the screen of the visible image display device 26, in addition to a normal display mode which is conventional. When choosing the partial image display mode and then setting an extraction temperature or a range of extraction temperatures, the partial extraction of the thermal image is achieved in such a way that the image processor 25 extracts a partial image of a whole thermal image of the observation sight which is covered in the field of view of the infrared sighting device 20 and cast on the infrared light sensor device 23 in conformity with the preset extraction temperatures. In other words, the image processor 25 extracts exclusively objects which emanate thermal radiation having temperatures corresponding to the extraction temperatures or falling within the range of extraction temperatures preset by the selector dial 27. The image processor 25 converts the partial image thus extracted suitably into visible wavelengths and transmits it to the visible image display device 26. In the non-display mode, the image processor 25 eliminates the partial image or converts the partial image into a hidden image or a latent image of the extracted object so as to clear the on-screen image of the visible image display device 26.

The optical observation device 1A made in this manner produces a visible image of a distant object as an observation target and a visible image of the distant object extracted from an infrared or thermal image produced by the image generator 24, both in the image focus location 14 of the observation telescope 10 enabling the wearer to view these visible images of the distant observation target and in the observation sight concurrently in a magnified form through the eyepiece lens system 13 of the observation telescope 10, that is of the optical observation device 1A. However, when making a choice of the non-display mode, the visible image display device 26 displays a hidden or latent image, so that the optical observation device 1A causes one of the visible images of the observation target, namely the visible image produced by the image generator 24, to disappear from observer's field through the observation telescope 10. Consequently, the optical observation device 1A then serves as a conventional field scope for the telescopic observation of a target object. If preferable, the image generator 24 may be temporarily inactivated in the non-display mode.

In the case of field observations such as with bird watching, when the image generator 24 keeps the selector dial 27 within the predetermined range of extraction temperatures between 38° C. and 42° C., which are the general body temperatures of wild birds, the image generator 24 is capable of displaying exclusively a visual image of a wild bird, either partly or entirely, as long as the bird is present in a forward wooded area. In addition, the infrared sighting device 20 is preferably provided with a functional capability to color the image projected in the focal position 14 by the image generator 24 to a distinctive color such as red. Since the image generator 24 produces and displays no image of things which have radiation temperatures beyond the extraction temperatures, the infrared sighting device 20 produces an image, colored or uncolored, of an object exclusively distinguished by the use of extraction temperatures.

Before explaining the operation of the optical observation device 1A thus constructed, some technical background of the present invention will be briefed with reference to FIGS. 2(A) through 2(E).

Figure 2A:
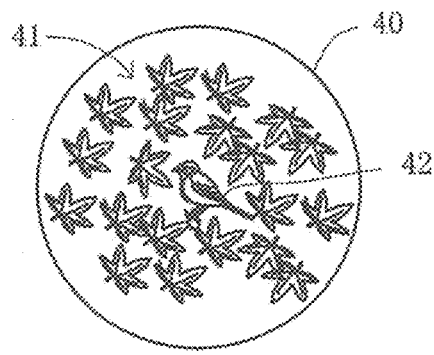
FIG. 2(A) is a schematic illustration showing an optical image of a forward observation sight captured in the field of view of a discrete optical telescope where a wild bird as an observation target is found as an observation target in the leaves of trees.
Figure 2B:
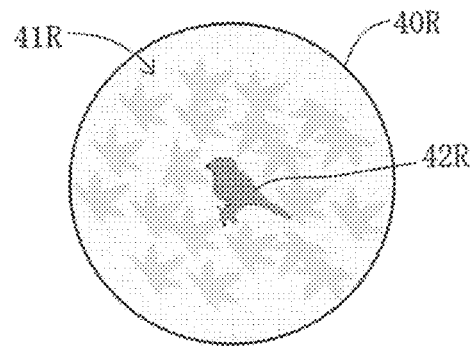
FIG. 2(B) is a schematic illustration showing an image of the observation sight brought into the field of view of a discrete infrared imaging device having a view angle equivalent to that of the optical telescope.

FIG. 2(A) schematically illustrates an optical image of a forward observation sight 41 such as leaves of trees inhabited or settled by a wild bird 42 as an observation target which is captured in the field of view (observation field) 40 of a discrete (separately completed) monocular shaped telescope (not shown), identical in optical structure and function to the observation telescope 10 of the optical observation device 1A, in the case of viewing the forward observation sight by the discrete telescope. FIG. 2(B) schematically illustrates a thermal image 41R of the same forward observation sight 40R which is however captured in the field of view of a discrete infrared sighting device similar in optical structure and function to the infrared sighting device 20 of the optical observation device 1A. The thermal image 41R is visually recognized in the form of temperature distribution. Since it is typical that the infrared light sensor element is made of a relatively small number of pixels and consequently produces only a thermal image low in the degree of separation (resolution) or grainy in itself, the thermal image of a wild bird cast on the infrared light sensor element leads to such poor image quality as ambiguous depiction in the details of a shape and a border of the wild bird.

Figure 2C:
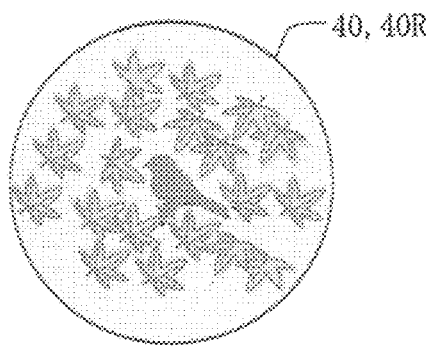
FIG. 2(C) is a schematic explanatory illustration showing a superimposed image of the observation sight image produced by the optical telescope shown in FIG. 2(A) and the observation sight thermal image produced by the infrared imaging device shown in FIG. 2(B)

FIG. 2(C) schematically illustrates the thermal image 41R of the observation sight (shown in FIG. 2(B)) produced by the virtual infrared sighting device over the optical image 41 of the same observation sight (shown in FIG. 2(A)) produced respectively by the virtual monocular-shaped telescope. In this case, since the superposition is done by overlaying the thermal image 41R as a sighting marker, which tends to be a poor quality image, simply on the optical image 41 for observation, the sighting thermal image 41R poor in image quality gains visual superiority against the optical image 41. Consequently, if this visual superiority of the sighting thermal image 41R remains or is the same, the practical observation of the observation target is almost impossible.

Figure 2D:
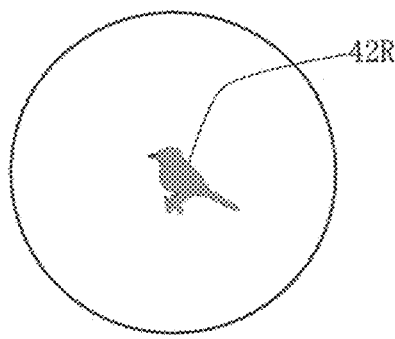
FIG. 2(D) is a schematic explanatory illustration showing a thermal image of an observation target such as a wild bird which is specified by temperatures between 38° C. and 42° C. of, for example, thermal radiation emitted from the observation target and discriminatively extracted from the observation sight thermal image produced by the infrared imaging device shown in FIG. 2(B)

Now returning to the present invention, according to the optical observation device 1A, the infrared sighting device 20 is made so as to be capable of selectively setting temperatures for partial image extraction and of displaying a thermal image of an observation target in a distinctively colored manner, for instance, red for perceivable visibility and adaptability to observation. When setting the extraction temperature to a range from 38° C. to 42° C. within which radiation temperatures of a large proportion of wild birds fall and displaying a thermal image which is extracted from the thermo image of the forward observation sight according to the preset extraction temperatures and coloring those temperatures red, the image generator 24 generates and displays only a red-colored visible image of the wild bird 42R on the visual visible image display device 26 such as shown in FIG. 2(D).

Figure 2E:
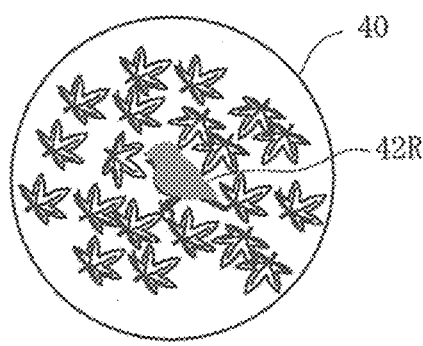
FIG. 2(E) is a schematic explanatory illustration showing a superposed image of the observation sight image produced by the optical telescope shown in FIG. 2(A) and the extracted thermal image of the observation target shown in FIG. 2(D)

Consequently, when spatially displaying and overlaying the red-colored thermal image 41R of the wild bird 42R as a sighting marker (a red-colored pictorial bird) on the optical image 41 produced by the observation telescope 10 in the focal position 14 of the optical observation device 1A by means of the image projection optical system 18, it is easy to perceive demonstratively and definitely the red-colored pictorial wild bird, that is the observation target and the sighting marker, in the clear optical image of the forward observation sight as shown in FIG. 2(E). Then, the non-display mode may be selected by the selector dial 27 after ascertaining the existence of the wild bird 41R in the forward observation sight, the optical observation device 1A allows only an observation of a clear optical image captured in the field of view 41 of the observation telescope 10.

While the forgoing description is directed to the case where the observation sights captured by the observation telescope 10 and the infrared sighting device 20 coincided with each other, if an observation target is absent from the observation sight captured in the field of view of the observation telescope 10 or is latently located in the observation sight, it is nearly impossible to search and find the observation target.

However, the optical observation device 1A of the present invention easily enables sighting and finding an observation target even when the observation target is absent from or is latently located in the observation sight captured by the observation telescope 10. The following description will be hereafter directed to such an event where an observation target has a place outside the observation sight 40 captured by the observation telescope 10 with reference to FIGS. 3(A) through 3(F).

Figure 3A:
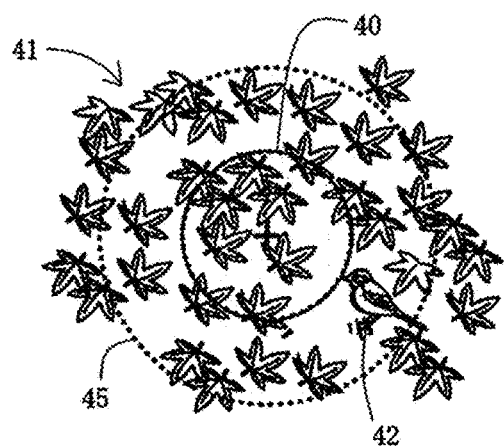
FIG. 3(A) is a schematic illustration showing of a forward field as a sighting area encompassed in an angular range of vision approximately twice as large as the view angle of the observation telescope of the optical observation device shown in FIG. 1 and an image of an area in the sighting area encompassed in the view angle of the optical telescope of the optical observation device shown in FIG. 1.
Figure 3B:
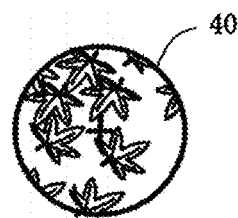
FIG. 3(B) is a schematic illustration showing an image actually seen through the optical observation device shown in FIG. 1.

As shown in FIG. 3(A), if a wild bird 42, which is an observation target, is absent from an observation area 40 (circled by a solid line) captured in the field of view of the observation telescope 10 but has a place within an envisioned forward observation sight 45 (circled by a broken line) intended for observation which is, in this instance, dimensioned double as large as the field of view of the observation telescope 10. In this instance, the observation telescope 10 is oriented so as to take sight nearly on the central area of the envisioned observation sight 45. Apparent from the illustration of FIG. 2(A), the field of view 40 of the observation telescope 10 overlaps nearly the central area of the envisioned observation sight 45. As being able to understand from FIG. 3(B) illustrating a forward observation sight captured by the optical observation device 1A, more specifically in the field of view of the observation telescope 10, no observation target is acquired by the optical observation device 1A.

Figure 3C:
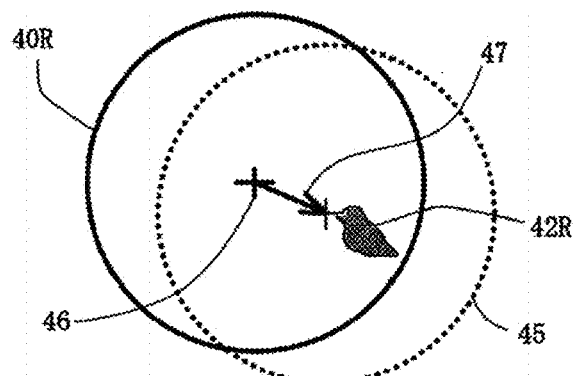
FIG. 3(C) is a schematic explanatory illustration showing development of the acquisition of a wild bird as an observation target into the center of the viewing field of the observation telescope by a center-oriented movement of the optical axis of the observation telescope relative to an extracted image of an observation target as a sighting marker.

In consideration of such an unfavorable result, the infrared sighting device 20 is equipped with a field of view 40R almost double as large as the field of view 40 of the observation telescope 10 so as to make the sighting field 40R comparative to the envisioned forward observation sight 45 as shown in FIG. 3(A). The infrared sighting device 20 with thus optimized performance is capable of acquiring a wild bird 42 within the sighting field 40R thereof. As already described above, the image generator 24 is capable of extracting a thermal image of the observation target specified with the preset extraction temperatures and converts the extracted thermal image to a visible image distinctively colored, in this instance red, and display it on the visible image display device 26 and this process is performed through signal processing by the image processor 25. The red-colored bird image 42R is projected into the optical path along the optical axis 10X of the observation telescope 10 and is seen as a pictorial red image of the observation target through the eyepiece lens system 13. The red-colored bird image 42R, which is restrictively extracted from the envisioned forward observation sight 45 captured by the infrared sighting device 20 as shown by a solid line in FIG. 3(C), is played for a sighting marker (which is identified with referenced numeral 42R if needed) as will be described in detail later. As seen in FIG. 3(C), the infrared sighting device 20 is preferably equipped with a cross line 46 applied in a field frame with the intersection positioned with the optical axis 20X. In this state, when orienting the optical observation device 1A so that the infrared sighting device 20 moves and drives and orients the cross line 46, which coincides with the optical axis 20X of the infrared sighting device 20, to approach closely the red-colored bird image or the sighting marker 42R in the sighting field of view 40R as indicated by an arrow 47 in FIG. 3(C), the infrared sighting device 20 displaces its optical axis 20X relatively toward the red-colored sighting marker 42R which stands still in the envisioned observation sight 45. As long as the wild bird 42 stays in the observation sight 41 while the infrared sighting device 20 continues the center-oriented movement until the cross line 46 and the red-colored bird image or the sighting marker 42R are aligned, the infrared sighting device 20 acquires the wild bird 42 almost at the center of the field of view 40R thereof as depicted by the broken line in FIG. 3(C).

As the optical observation device 1A has a single rigid configuration comprising the observation telescope 10 and the infrared sighting device 20 optically coupled to each other, the center-oriented movement of the infrared sighting device 20 is always accompanied by a congruent dynamical performance of the observation telescope 10. Accordingly, the observation telescope 10 shifts its field of view from the central area of the observation sight 41 where it previously was aimed and in which the wild bird 42 was absent therefrom to a local area where it captures the wild bird 42 within the field of view 40. In this occupied location accomplished by the center-oriented movement, the observation telescope 10 brings a peripheral area of the envisioned observation sight 41 with the wild bird 42 involved therein into view as depicted by a broken line in FIG. 3(C).

Figure 3D:
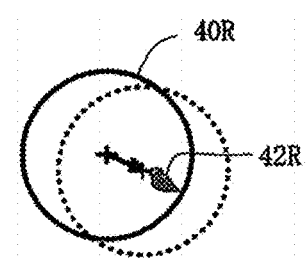
FIG. 3(D) is a schematic illustration showing an aspect of the field of view of the observation telescope in which a wild bird is captured as an observation target around the center area.
Figure 3E:
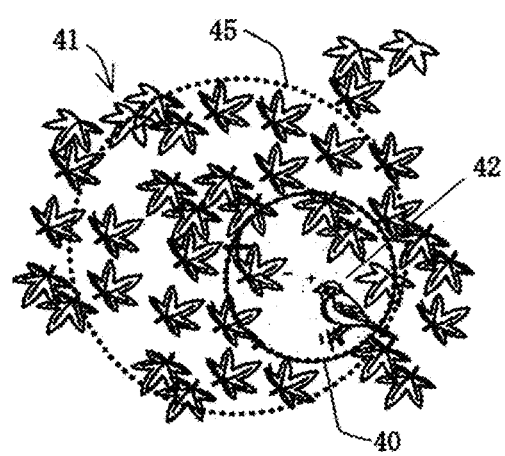
FIG. 3(E) is a schematic explanatory illustration showing a spatial relative position of an image of observation sight of the observation telescope in which a wild bird is acquired as an observation target around the center of viewing field of the observation telescope and a forward field as a sighting area.

Shown in FIG. 3(E) is a spatial position of the sighting marker 42R (the red-colored image of the wild bird) provided as a sighting marker by the infrared sighting device 20 in the observation sight 40 of the observation telescope 10 relative to the envisioned observation sight 41 upon acquirement of the wild bird 42 around the center of the sighting field of view of the infrared sighting device 20. The sighting marker 42R, which is the red-colored image of the wild bird 42 provided by the infrared sighting device 20, overlaps completely with an image of the wild bird 42 provided by the observation telescope 10.

Figure 3F:
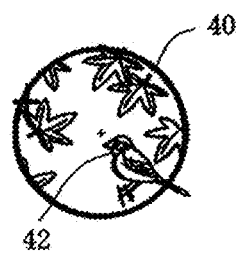
FIG. 3(F) is a schematic illustration showing an image of the observation sight of the observation telescope in which a wild bird is acquired as an observation target around the center of the viewing field of the observation telescope.

As understood from FIG. 3(E) and the foregoing description, in the superimposed condition, the wild bird image 42R distinctively colored red as a sighting marker is easily and demonstrably perceptible. Then, when manually operating the selector dial 27 to change the infrared sighting device 20 to the non-display mode, the image generator 24 drives the visible image display device 26 to eliminate the red-colored wild bird image 42R or displays a hidden image or a latent image of the extracted observation target thereon, or otherwise causes the visible image display device 26 to be functionally disabled. Consequently, the optical observation device 1A casts away the red-colored bird image 42R as a sighting marker from the field of view of the observation telescope 10, so that the optical observation device 1A enables clear observation of the intended observation sight 41 with the wild bird 42 contained therein in the form of a magnified optical image through the eyepiece lens system 13 as shown in FIG. 3(F).

When the infrared sighting device 20 captures the sighting marker (the red-colored bird image) 42R around the center in the sighting field 40, the optical observation device 1A is functionally switched to the non-display mode through manual operation of the selector dial 27, so as thereby to force the image processor 25 to be disabled and functionally eliminating the on-screen image, i.e. the sighting marker (the red-colored bird image) 42R, from the visible image display device 26. Consequently, the optical observation device 1A removes the red-colored wild bird image 42R from the field of view thereof, with a resultant clear observation of the observation sight 40 containing the wild bird 42 captured in the field of view of the observation telescope 10.

Although the foregoing description according to a preferred embodiment of the present invention is given with a focus on the field of the two functional devices of the optical observation device 1A, as long as the infrared sighting devices 20 employs the eyepiece lens system 13 of the observation telescope 10 commonly as a constituent element thereof, which is indispensable to sighting or training the observation telescope 10 on an observation target by the use of the extracted image, it is permissible that the extracted image dimensionally confirms to a field frame of the observation telescope 10, or otherwise, permissible to reduce the extracted image shown in FIG. 3(C) by infrared sighting device 20 to half in size so as to conform in size to the field of view of the observation telescope 10 shown in FIG. 3(D) if the infrared sighting device 20 has a field of view twice as large as the observation telescope 10.

It is preferable for an extensive range of applications of the optical observation device that the infrared sighting device 20 is provided with a view angle greater than that of the observation telescope 10 or with a variable view angle.

Although the infrared image results from a relatively small number of pixels of the infrared light sensor device 23, the extracted image such as a wild bird image produced by the infrared sighting device 20, which is projected in the field of view of the observation telescope 10, is a collective image of red spots which are fuzzy in shape and profile; nevertheless, the sighting and the observation of a target object can be accomplished with ease by providing the observation telescope 10 with a reticle such as a crossed lines. Specifically, sighting on and observation of the target object can be carried out by moving the optical observation device 1A so that the field of view of the observation telescope 10 is overlaid with the field of view of the infrared sighting device 20 and, correspondingly, the sighting marker (the red-colored wild bird image expressed by an collective image of spots) lies over the cross line in the field of view of the observation telescope 10. Upon attainment of the overlying, the infrared sighting device 10 is changed in functional mode from the partial image display mode to the non-display mode for clear observation. It is possible of course that if designed exclusively for bird watching and provided with fixed extraction temperatures, the optical observation device 1A can be offered at significantly lower prices.

In the following description directed to alternative embodiments of the present invention, the components of the optical observation device which are the same as or correspond to those of the optical observation device 1A are intended to use the same reference numerals and explanations thereof will be omitted.

Figure 4:
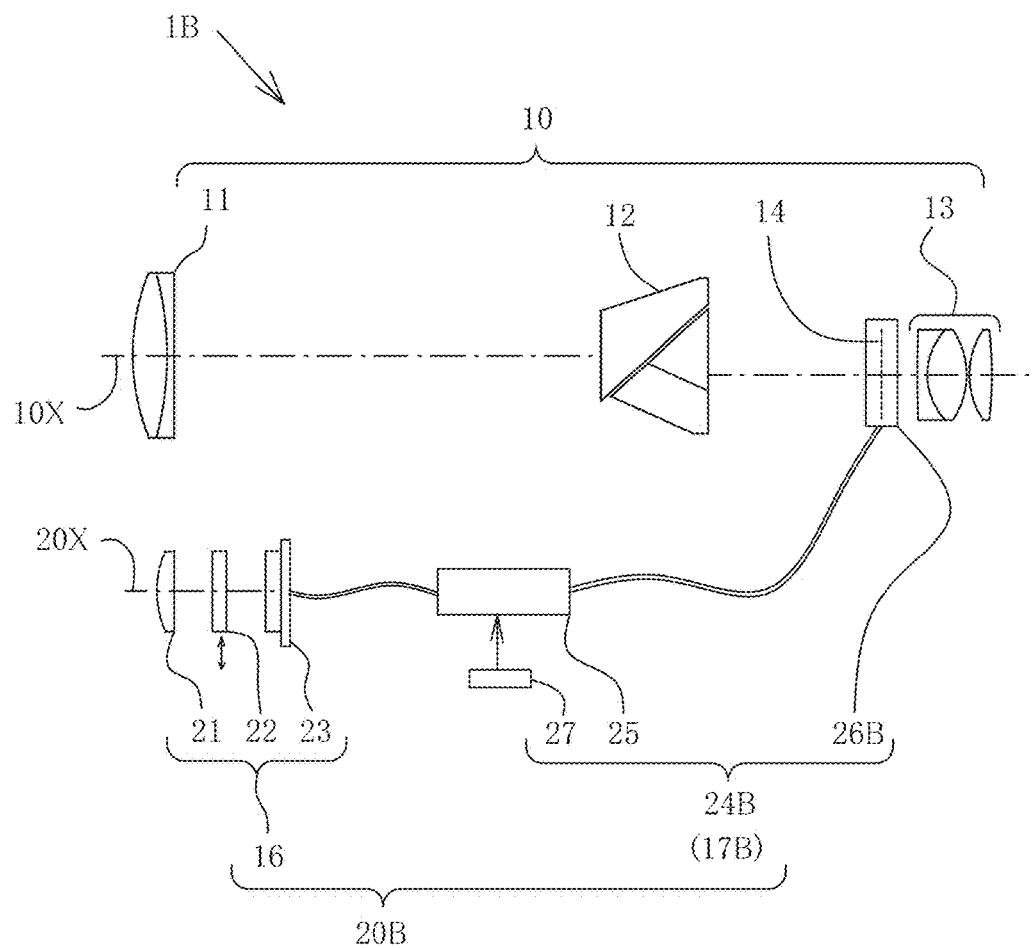
FIG. 4 is a schematic illustration showing an optical observation device of a monocular-shaped type in accordance with an alternative embodiment of the present invention.

FIG. 4 is a schematic illustration showing an optical observation device 1B according to an alternative embodiment of the present invention. In the following description, note that the optical observation device 1B is similar in structure and operation to the comparative device 1A shown in FIG. 1 except for the replacement of the visible image display device with a transmissive visible image display device.

As illustrated in FIG. 4, the optical observation device 1B, which is of the binocular-shaped telescope type only in appearance, is comprised of an observation telescope 10, exactly identical in structure and operation with that of the previous embodiment, for producing a visible optical image of a distant observation object in the field of view thereof and an infrared sighting device 20B for producing, as a final output, a visible image of the observation target as a marker image. These devices 10 and 20B have their optical axes 10X and 20X disposed in parallel and are built in an integral housing (not shown). The infrared sighting device 20B is similar in structure and the operation is similar to that of the previous embodiment but replaces the visible image display device 26 of the previous embodiment with a transmissive visible image display device 26B.

Specifically, the observation telescope 10 is comprised of an objective lens system 11, an erecting prism 12 and an eyepiece lens system 13 arranged in this order in the optical path along the optical axis 10X. The eyepiece lens system 13 is commonly used as an eyepiece lens system of the optical observation device 1B. The observation telescope 10 produces a visible optical image of a forward observation sight with an observation object (not shown) located therein in the image focus location 14 by the objective lens system 11 and allows an observer or a watcher to view or watch an erected visible image of the observation sight through the eyepiece lens system 13.

On the other hand, the infrared sighting device 20B, which assists in sighting the observation telescope 10 on the observation target with ease, is essentially comprised of an infrared imaging means 16 and a visible image display means 17B. The infrared imaging means 16 includes an objective lens system 21 and a non-cooled type of infrared light sensor device 23 appropriately located behind objective lens system 21 arranged in the optical path along the optical axis 20X. The infrared light sensor device 23 displays a thermal image of the forward observation sight in the form of temperature distribution cast thereon by the objective lens system 21. The infrared sighting device 20B is further comprised of the visible image display means 17B which is comprised of an image generator 24B including an image processor 25 for generating a thermal infrared image thereon and a transmissive visible image display device 26B for displaying a visible image thereon. The image processor 25 extracts a partial thermo image of the observation target according to preset extraction temperatures from a thermal infrared image of the observation sight which the infrared sighting device 20B captures in the field of view and is cast on the infrared light sensor device 23 and then converts the extracted thermo image to a visible image. These extraction and conversion of the image of the observation target are performed by means of signal processing. The transmissive visible image display device 26B is disposed in the optical path along the optical axis of the observation telescope 10 with its display screen correctly positioned in the focal position 14 of the observation telescope 10 which is the focal position of the eyepiece lens system 13 of the optical observation device 1B.

The image generator 24B, specifically the image processor 25 and the transmissive visible image display device 26B, fractionally extracts a thermal image of the observation sight, i.e. a wild bird in this instance, according to preset extraction temperatures, such as body temperatures of wild birds falling in a range from 38° C. to 42° C. and converts the extracted thermal image into a visible image suitable for the transmissive visible image display device 26B. Based on the image signal extraction and conversion, the transmissive visible image display device 26B displays a visible image of the observation target, i.e. a wild bird, as a sighting marker on its screen. In the same manner as the previous embodiment, the optical observation device 1B produces and projects a magnified visible image of an intended forward observation sight and a magnified visible image of an observation target staying in the forward observation sight and allows simultaneous observation of these magnified images through the eyepiece lens system 13. By the use of the sighting marker, which is a magnified visible image of an observation target, the optical observation device 1B is operated in the same manner as described in connection with the previous embodiment so as to acquire the observation target, the wild bird, in the field of view of the observation telescope 10. The optical observation device 1B, which employs the transmissive visible image display device 26B in place of the ordinary image display device 26, renders the image projection optical system 18 comprised of at least a relay lens system 28 and a half mirror 29 redundant irrespective of the same operational and functionally advantageous effects as in the previous embodiment.

It is permissible to employ various types of transmissive visible image displays well known in the art such as thin film transistor-liquid crystal displays (TFT LCDs), inorganic electroluminescence displays (ELDs), organic electroluminescence displays (ELDs) and polymer dispersive liquid crystal displays as the transmissive visible image display device 26B. It is also permissible to use FTT LCDs in which specific pixels are made opaque, inorganic EL displays and organic EL displays in which specific pixels are luminescent, polymer dispersive liquid crystal displays in which specific pixels are made opaque so as to reflect eternal light and so on. In any of the displays, pixels other than the specific pixels are transparent.

In the case of applying a telescopic device such as a field scope to the observation telescope 10 of the optical observation device 1A which is provided with the partially transmitting mirror 33 between the erecting prism 12 and the eyepiece lens system 13, it is unavoidable to provide the field scope housing with an extra support mechanism for the half mirror 29 which increases costs. However, the optical observation device 1B of the alternative embodiment is completed by the simple installation of the transmissive visible image display device 26B in the image focus location as a constitutive element of the eyepiece lens system 13. This simple installation of the transmissive visible image display device 26B enables conventional monocular-shaped telescopes to be modified for practical uses and contributes to significant practical advantages.

Figure 5:
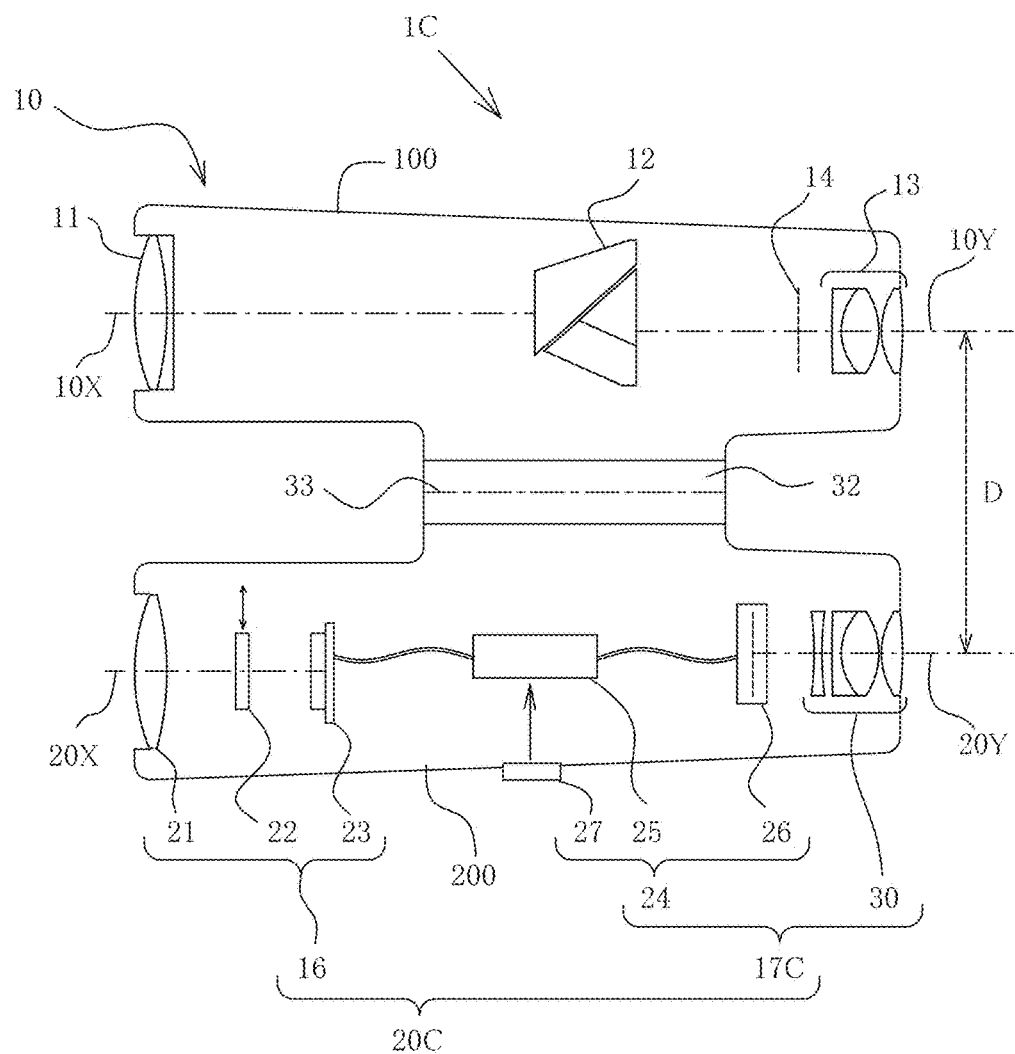
FIG. 5 is a schematic illustration showing an optical observation device of a binocular type in accordance with another embodiment of the present invention.

FIG. 5 is a schematic illustration showing a binocular-shaped optical observation device 1C in accordance with another preferred embodiment of the present invention. As shown in FIG. 5, the optical observation device 1C is comprised of a monocular-shaped observation telescope 10 and a monocular-shaped sighting device 20C which are installed in individual housings 100 and 200 and are mechanically coupled to each other by means of a folding bridge 32 rotatable about a pivot axis 33. The observation telescope 10 and the infrared sighting device 20C have optical axes 10X and 20X parallel each other.

The observation telescope 10, which is functionally and structurally identical with those of the previous embodiments, is comprised of a first objective lens system 11, an erecting prism 12 and a first eyepiece lens system 13 arranged in this order in the optical path along the optical axis 10X and produces an optical visible image of an envisioned forward observation sight intended for observation and captured in the field of view thereof. The first eyepiece lens system 13 has an optical axis 10Y, which may or not may be an extension of the optical axis 10X.

The infrared sighting device 20C, which serves to assist in training or sighting the observation telescope 10 on an aimed observation target staying in the envisioned forward observation sight with ease, is comprised of an infrared imaging means 16 and a visible image display means 17C. The infrared imaging means 16 includes an objective lens system 21 and a non-cooled infrared light sensor device 23 appropriately located behind objective lens system 21 arranged in the optical path along the optical axis 20X. The visible image display means 17C is comprised of an image generator 24, which includes an image processor 25 and visible image display device 26, and a second eyepiece lens system 30. The objective lens system 21 and the non-cooled infrared light sensor device 23 are arranged in this order in an optical path along the optical axis 20X. The visible image display device 26 and the second eyepiece lens system 30 are arranged in the optical path along an optical axis 20Y, which may or not may be an extension of the optical axis 20X The constituent elements of the infrared sighting device 20C, except for the second eyepiece lens system 30, are identical in structure and operation with the corresponding constituent elements of the optical observation device 1A which is the first preferred embodiment. Denoted by reference numerals 22 and 27 are respectively a shutter 22 capable of moving in and out of the optical path between the first objective lens system and the infrared light sensor device 23 and a selector dial 27 operationally connected to the image processor 25 for setting extraction temperatures and selecting functional modes of the visible image display device 26.

The eyepiece lens system 30 has a focus location on the visible image display device 26 so as thereby to magnify the observation target image displayed on the visible image display device 26. The image of an intended observation sight and the image of an observation target staying in the observation sight can be concurrently watched through the first and the second eyepiece lens system 13 and 30.

The pivotal coupling between the observation telescope 10 and the infrared sighting device 20C permits random adjustment of the inter-axial distance between optical axes 10Y and 20Y of the first and the second eyepiece lens system 13 and 30. The human eye separation is generally between approximately 60 mm and 70 mm. Therefore, when making the optical observation device 1C adjustable in the inter-axial distance between the first and the second eyepiece lens system 13 and 30 within the limits including the general range of eye separation from 60 mm to 70 mm, it is enabled to peer through the optical observation device 1C with both eyes pressed down lightly onto the first and the second eyepiece optical system 13 and 30. Consequently, it allows a viewer to concurrently see the optical image of an intended observation sight produced by the observation telescope 10 and the optical image of an observation target extracted as a sighting marker of the intended observation sight image by the infrared sighting device 20C. When operating the selector dial 27 causing the visible image display device 26 to clear its on-screen image, the optical observation device 1C enables viewing only the optical image of the intended observation sight through the eyepiece optical systems 13 thereof.

The infrared sighting device 20C is preferably equipped with a cross line 46 applied in a field frame with the intersection positioned with the optical axis 20X. In this state, the optical observation device 1C is operated so that the infrared sighting device 20C orients the cross line 46, which coincides with the optical axis 20X of the infrared sighting device 20, to approach closely the sighting marker (the red-colored bird image) 42R in the sighting field 40R as indicated by the arrow 47 in FIG. 3(C). Upon alignment of the cross line 46 with the sighting marker 42R, the infrared sighting device 20 acquires the wild bird 42 almost at the center of the field of view 40R thereof as depicted by a broken line in FIG. 3(C). In the same manner as previously described, the center-oriented movement of the infrared sighting device 20 is always accompanied by a congruent dynamical performance of the observation telescope 10. Accordingly, the observation telescope 10 shifts the field of view from the central area of the observation sight 41 where the wild bird 42 is absent to a local area where the wild bird 42 stays. In this occupied location accomplished by the center-oriented movement, the observation telescope 10 brings a peripheral area of the envisioned observation sight 41 with the wild bird 42 involved therein into view as depicted by the broken line in FIG. 3(D).

The optical observation device 1C may be comprised of the observation telescope 10 and the infrared sighting device 20C coupled by means of a parallel adjustable bridge in place of the rotatable folding bridge 32. In this instance, while it is hard to press the right and left eyes together against the first and the second eyepiece lens system 13 and 30, the optical observation device 1C is capable of complying with the same operational procedure as the previous embodiments by means of peering through the first and the second eyepiece lens system 13 and 30 alternately with either eye. This parallel adjustable bridge permits parallel sliding movement of the observation telescope 10 and the infrared sighting device 20C close to and away from each other in the direction perpendicular to the optical axes 10X and 20X, so that the inter-axial distance D of the first and the second eyepiece lens system 13 and 30 is suitably adjusted to the user's eye separation.

Figure 6:
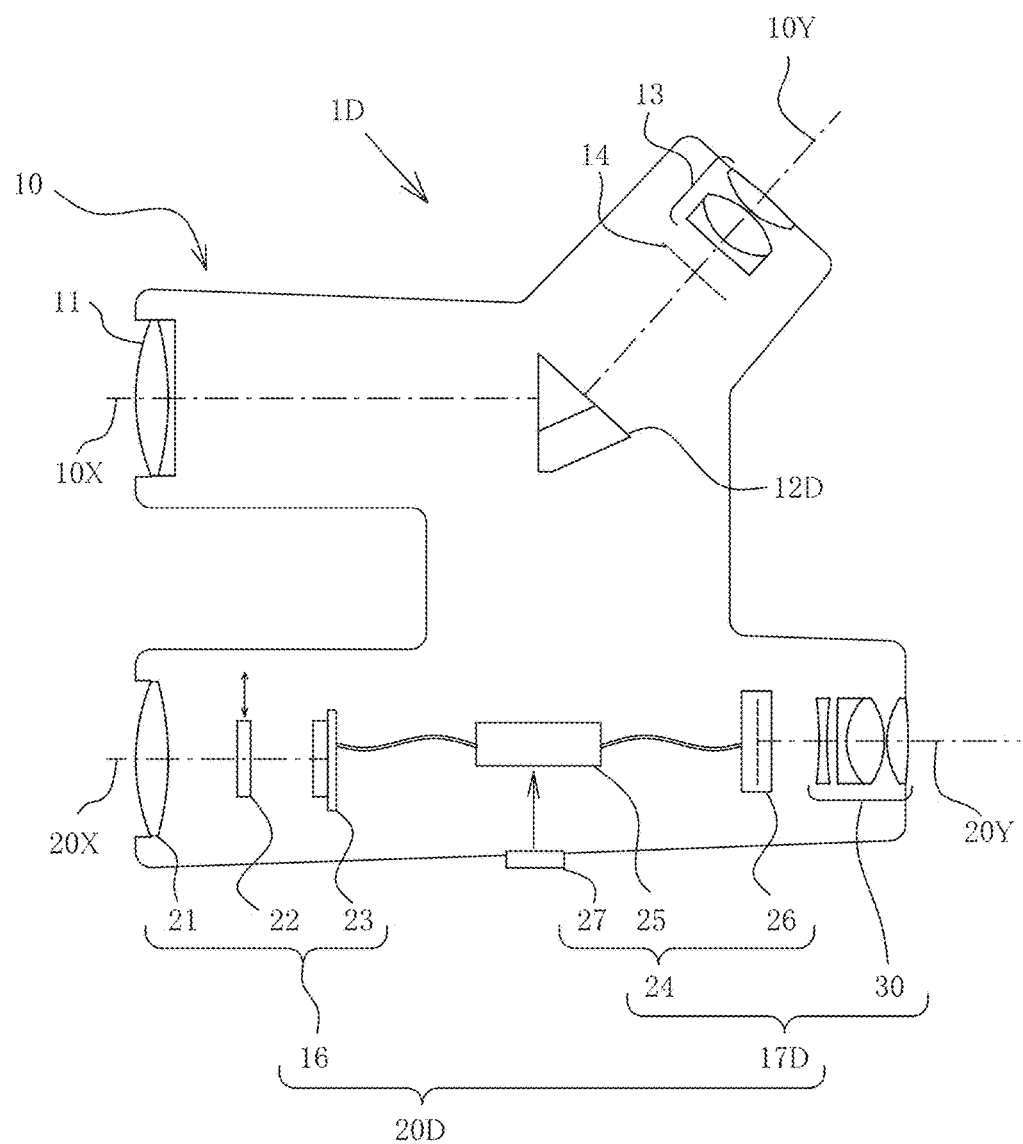
FIG. 6 is a schematic illustration showing an optical observation device of a binocular type in accordance with still another embodiment of the present invention.

FIG. 6 is a schematic illustration showing a binocular-shaped optical observation device 1D in accordance with still another embodiment of the present invention. The optical observation device 1D is totally identical in optical structure and operation to that of the previous embodiment, except for a single rigid housing and installation of an erecting prism 12D which inflects the axis of exit light at 45° relative to the axis of incident light.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. An optical observation device for field observation of an observation target staying in a forward observation sight, comprising:
    an optical telescopic means situated on one of a pair of parallel optical axes for producing a visible image of the forward observation sight and allowing observation of the forward observation sight therethrough; and
    an infrared sighting means situated on the other of the pair of parallel optical axes and optically coupled to the optical telescopic means,
    wherein the infrared sighting means generates a visible image of the observation target from an infrared image of the forward observation sight and spatially displays the visible image of the observation target in an image focus location of the optical telescopic means so as to superimpose the visible image of the observation target as a sighting marker on the visible image of the forward observation sight for simultaneous observation of both the visible images of the observation target and the forward observation sight through the optical telescopic means.

2. The optical observation device as defined in claim 1, wherein the optical telescopic means comprises a monocular optical telescope having at least a first objective lens system for producing the visible image of the forward observation sight acquired in a field of view thereof and a first eyepiece lens system for viewing the visible image of the forward observation sight, and the objective lens system and the first eyepiece lens system are arranged coaxially along one of a pair of parallel optical axes.

3. The optical observation device as defined in claim 2, wherein the infrared sighting means, including the first eyepiece lens system as one structural component part thereof, comprises an infrared imaging means and a visible image display means,
    wherein the infrared imaging means comprises a second objective lens system for forming the infrared image of the observation sight and an infrared image sensor device on which the infrared image of the observation sight is cast in the form of temperature distributions,
    wherein the second objective lens system and the infrared image sensor device are arranged coaxially along the other optical axis; and
    wherein the visible image display means comprises an image processor capable of performing, by means of signal processing, an extraction of an infrared image of the observation target from the infrared image of the forward observation sight cast on the infrared image sensor device according to a predetermined extraction temperature as well as a conversion of the extracted infrared image to a visible image of the observation target; a visible image display device for displaying the visible image of the observation target thereon; and an image projection optical system capable of spatially displaying the visible image of the observation target cast on the visible image display device in an image focal location of the first objective lens system of the optical telescopic means so as to superimpose the visible image of the observation target on the visible image of the forward observation sight for simultaneous observation of both the visible images of the forward observation sight and the observation target through the first eyepiece lens system of the monocular optical telescope.

4. The optical observation device as defined in claim 3, wherein the image processing means extracts the infrared image of the observation target according to predetermined extraction temperatures of thermal radiation emitted from the observation target.

5. The optical observation device as defined in claim 4, wherein the extraction temperature is variable.

6. The optical observation device as defined in claim 3, wherein the visible image display device is capable of being functionally disabled so as to clear away an on-screen image cast thereon.

7. The optical observation device as defined in claim 3, wherein the infrared sighting device has a view angle greater than that of the monocular optical telescope.

8. The optical observation device as defined in claim 3, wherein the infrared sighting device is variable in a view angle thereof.

9. The optical observation device as defined in claim 2, wherein the image projection optical system comprises a relay lens system capable of projecting and spatially displaying the visible image of the observation target cast on the visible image display device and a half mirror disposed in an optical path along the optical axis for orienting the projected visible image of the observation target to the image focus location of the first objective lens system of the monocular optical telescope.

10. The optical observation device as defined in claim 2, wherein the infrared sighting means comprises an infrared imaging means and a visible image display means,
    wherein the infrared imaging means comprises a second objective lens system for forming the infrared image of the observation sight and an infrared image sensor device on which the infrared image of the observation sight is cast in the form of temperature distributions, wherein the second objective lens system and the infrared image sensor device are arranged coaxially along the other optical axis; and wherein the visible image display means, including the first eyepiece lens system as one structural component part thereof, comprises an image processor capable of performing, by means of signal processing, an extraction of an infrared image of the observation target from the infrared image of the forward observation sight cast on the infrared image sensor device according to a predetermined extraction temperature and a conversion of the extracted infrared image to a visible image of the observation target, and a transmissive visible image display device disposed in the in the image focus location of the first objective lens system of the monocular optical telescope capable of displaying the visible image of the observation target thereon so as to superimpose the visible image of the observation target on the visible image of the forward observation sight for simultaneous observation of both visible images of the forward observation sight and the observation target through the first eyepiece lens system of the monocular optical telescope.

11. The optical observation device as defined in claim 2, wherein the infrared sighting means comprises an infrared imaging means, a visible image display means, and a second eyepiece lens system;

wherein the infrared imaging means comprises a second objective lens system capable of forming the infrared image of the observation sight and an infrared image sensor device on which the infrared image of the observation sight is cast in the form of temperature distributions, and the second objective lens system and the infrared image sensor device are arranged coaxially along the other optical axis;

wherein the visible image display means comprises an image processor capable of performing, by means of signal processing, an extraction of an infrared image of the observation target from the infrared image of the forward observation sight cast on the infrared image sensor device according to a predetermined extraction temperature as well as a conversion of the extracted infrared image to a visible image of the observation target; a visible image display device for displaying the visible image of the observation target thereon; and wherein a second eyepiece lens system has a focus location on the visible image display device so that the visible image of the observation target and the visible image of the forward observation sight are capable of being viewed individually as well as being able to simultaneously observe both the visible images of the forward observation sight and the observation target by means of binocular vision through the first and second eyepiece lens systems.

12. The optical observation device as defined in claim 11, wherein the image processing means extracts the infrared image of the observation target according to predetermined extraction temperatures of thermal radiation emitted from the observation target.

13. The optical observation device as defined in claim 12, wherein the extraction temperature is variable.

14. The optical observation device as defined in claim 11, wherein the visible image display device is capable of being functionally disabled to clear away an on-screen image cast thereon.

15. The optical observation device as defined in claim 11, wherein the infrared sighting device has a view angle greater than that of the monocular optical telescope.

16. The optical observation device as defined in claim 11, wherein the infrared sighting device is variable in a view angle thereof.

17. The optical observation device as defined in claim 1, wherein the optical telescopic means comprises at least a first objective lens system for producing the visible image of the forward observation sight acquired in a field of view thereof and a first eyepiece lens system for viewing the visible image of the forward observation sight, wherein the objective lens system and the first eyepiece lens system are arranged coaxially along one of a pair of parallel optical axes, and infrared sighting means comprises infrared imaging means and visible image display means, and, wherein the infrared imaging means comprises a second objective lens system for forming the infrared image of the observation sight and an infrared image sensor device on which the infrared image of the observation sight is cast in the form of temperature distributions, wherein the second objective lens system and the infrared image sensor device are arranged coaxially along the other optical axis and wherein the visible image display means comprises an image processor for performing, by means of signal processing, an extraction of an infrared image of the observation target from the infrared image of the forward observation sight cast on the infrared image sensor device according to a predetermined extraction temperature as well as a conversion of the extracted infrared image into a visible image of the observation target; a visible image display device for displaying the visible image of the observation target thereon; and a second eyepiece lens system having a focus location at which the visible image display device is disposed so as to enable the visible image of the observation target cast on disposed in a focus location to be seen so as y to allow observation of the visible image of the observation target simultaneously with observation of the visible images of the forward observation sight through the first eyepiece lens system.

18. The optical observation device as defined in claim 17, wherein said optical telescopic means and said infrared sighting means are respectively received in discrete housings mechanically coupled for rotatable motion so as to vary and adjust the distance between said pair of parallel axes to eye separation.

19. The optical observation device as defined in claim 18, wherein said distance between said pair of parallel axes is adjustable between 60 mm and 70 mm.

20. The optical observation device as defined in claim 17, wherein the image processing means extracts the infrared image of the observation target according to predetermined extraction temperatures of thermal radiation emitted from the observation target.

21. The optical observation device as defined in claim 20, wherein the extraction temperature is variable.

22. The optical observation device as defined in claim 17, wherein the visible image display device is capable of being functionally disabled so as to clear away an on-screen image cast thereon.

23. The optical observation device as defined in defined in claim 17, wherein the infrared sighting device has a view angle greater than that of the monocular optical telescope.

24. The optical observation device as defined in claim 17, wherein the infrared sighting device is variable in a view angle thereof.

\* \* \* \* \*